May 10, 1949.  E. T. WYMAN  2,469,678
COMBINATION STEAM AND GAS TURBINE
Filed Dec. 18, 1943  2 Sheets-Sheet 2
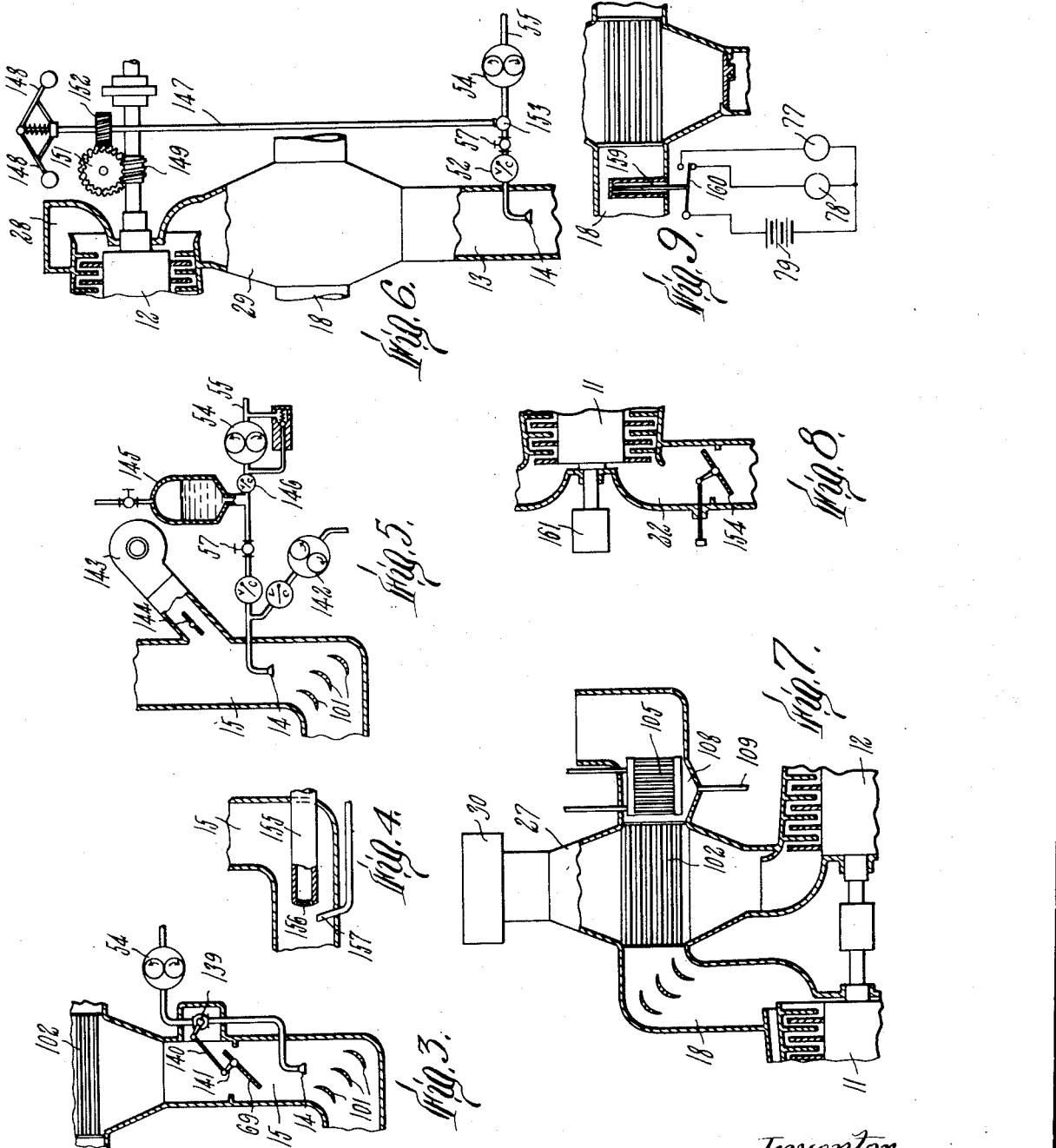

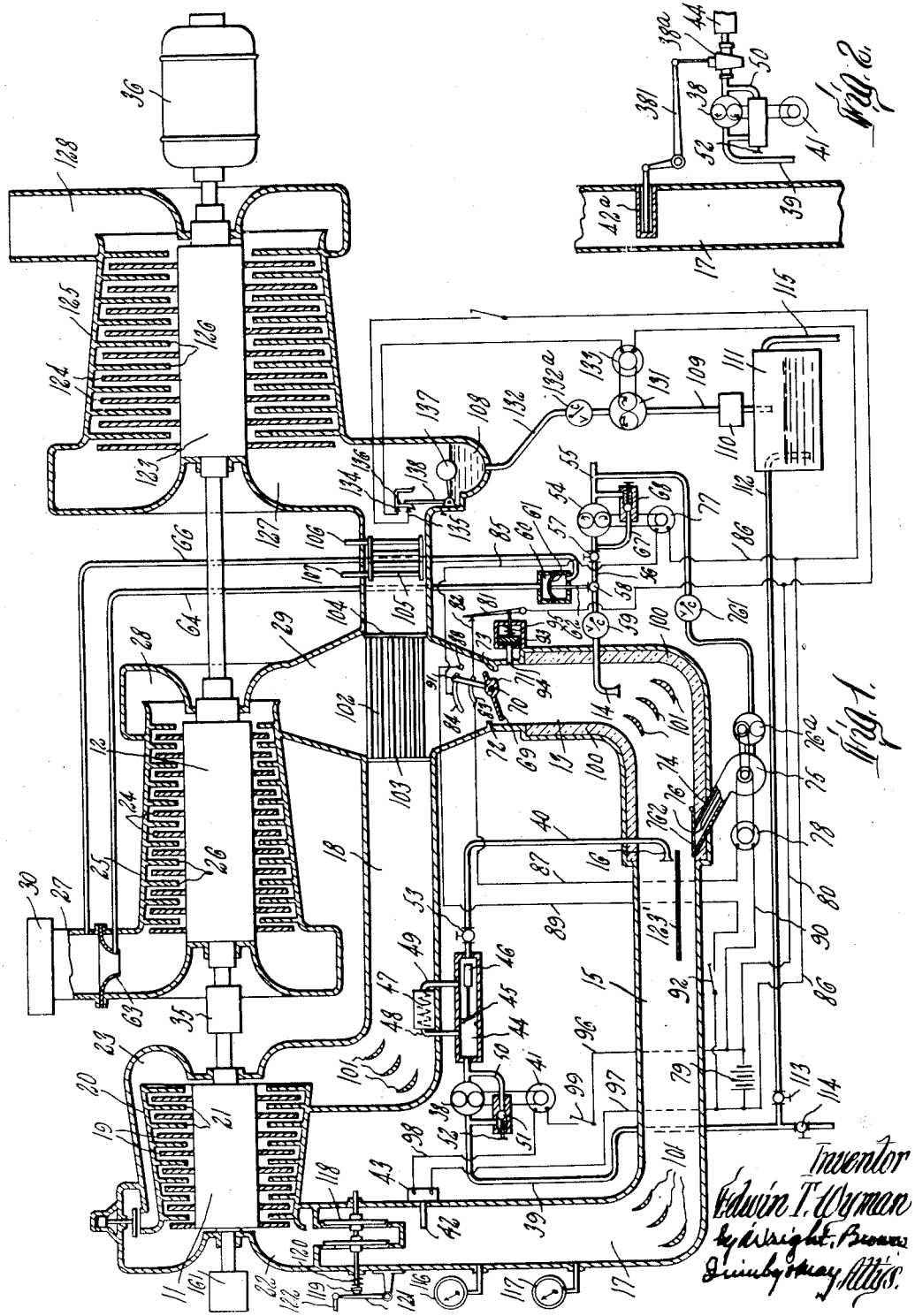

Patented May 10, 1949

2,469,678

UNITED STATES PATENT OFFICE 2,469,678

COMBINATION STEAM AND GAS TURBINE

Edwin T. Wyman, Brookline, Mass.

Application December 18, 1943, Serial No. 514,809

3 Claims. (Cl. 60—42)

This invention relates to turbines of the type in which hot gases are generated by the combustion of fuel in a stream of air and delivered to a turbine for conversion of their kinetic energy into mechanical power. The turbine drives an air compressor by which air is taken from the atmosphere and forced under pressure into and through a closed chamber in which combustion occurs and from which the hot gases are conducted to the turbine. This type of turbine is the most compact and simple, and is one of the most economical ever developed for the conversion of heat energy into mechanical power. However, in its uses heretofore there has been an unavoidable necessity of introducing a large excess of air, over that needed for combustion of the fuel supply, into the combustion chamber in order to reduce the temperature of the gases passing into the turbine to a low enough temperature to avoid rapid destruction and deterioration of the blades and guide vanes of the turbine. The power needed to compress and propel such large quantity of air has consumed a major fraction of the power developed by the turbine, and resulted in low efficiency.

My object is to provide an engine of this type which will operate with greater thermodynamic efficiency and in which the temperature and pressure may be definitely controlled. In accomplishing this object I utilize water as the agent for reducing the temperature of the flaming gases to a safe operating degree and the steam resulting from the interchange of heat between the gases and water as a major part of the working fluid applied to drive the turbine. I have also provided control means for regulating pressures and temperatures, condensing means for the exhaust steam and, in some embodiments of the invention, means for developing a vacuum in the exhaust gases, whereby to increase the power output from a given quantity of fuel.

In one of its aspects, the present invention bears a relation to the gas turbine engines heretofore known similar to the relation between the invention set forth in my Patent No. 2,147,074, February 14, 1939, and the modern internal combustion engine. In other aspects the invention comprises novel and important starting means, control means, and combinations with condensing means and gas exhausting means; all as described in the following specification with reference to illustrative drawings.

In the drawings—

Figure 1 is a diagrammatic sectional view of a gas-steam turbine embodying the essential and other important features of the invention.

Figure 2 is a fragmentary sectional view showing an alternative means to that represented in Figure 1 for controlling the supply of water to the hot gases.

Figure 3 is a similar view showing alternative means for controlling the main fuel supply.

Figure 4 is a fragmentary sectional view showing a type of burner for gas or pulverized solid fuel usable in substitution for the liquid fuel burner shown in other figures.

Figure 5 is a diagrammatic sectional view showing an arrangement of starting means and fuel control alternative to that shown in Figure 1.

Figure 6 is a diagrammatic sectional elevation of a portion of the apparatus showing control means of the centrifugal governor type.

Figure 7 is a fragmentary sectional view showing an arrangement of condensing means alternative to that shown in Figure 1.

Figure 8 is a fragmentary sectional view of the admission end of the turbine showing a type of throttle valve therefor which may be used in substitution for the throttle valve shown in Figure 1.

Figure 9 is a diagram illustrative of means whereby the temperature of the exhaust from the turbine controls the starting means and main burner.

These diagrammatic drawings are intended to show principles rather than any exact construction or essential arrangement of parts relative to one another. The several elements of the combination may have various forms and may be standard known articles of equipment or be specially designed to serve particular purposes.

Referring first to Figure 1, the principal parts of the apparatus comprise a turbine 11, an axial air compressor 12 coupled to the turbine and driven thereby, a combustion chamber 13, a fuel supply nozzle or burner 14 in the combustion chamber, a duct 15 leading from the combustion chamber and constituting a vaporizing chamber, a water nozzle or spray head 16 in the vaporizing chamber, a duct 17 leading from the vaporizing chamber to the intake of the turbine, and an exhaust duct 18 leading away from the outlet end of the turbine. Preferably there is combined with the foregoing an exhauster driven by the turbine and connected with duct 18 to pull gases therefrom. The turbine is or may be a standard steam turbine of any approved design, consisting of a rotor having a succession of encircling blades or buckets 19 of progressively increasing lengths from the admission to the exhaust end of the turbine, rotating in a housing 20 between rows of guide vanes 21 which project inwardly from the housing. An annular intake passage 22 is connected with the duct 17 and opens into the annular space between the turbine rotor and the housing at the smaller end of the latter and an annular exhaust chamber 23 opens from the larger end of the annular space in communication with the exhaust duct 18.

The axial compressor 12 is generally similar to the turbine, having a rotor with buckets or blades 24 contained in the housing 25 with its buckets between rows of vanes 26 secured to the housing. It is reversed in arrangement from the turbine, taking air from the atmosphere through an intake 27 to the larger end of the annular space between the rotor and housing, and delivering the air at an increased pressure from a smaller end of the annular space to a chamber 28 from which the duct 29 leads to the intake end of the combustion chamber 13. Preferably a filter 30 is located at the entrance to the intake duct 27. The turbine and compressor rotors are preferably located in axial alinement and connected by a coupling 35. They may, however, be otherwise arranged and the compressor driven by the turbine through other means than a direct coupling. The excess of power generated by the turbine over that required to drive the compressor is utilized to perform useful work; there being shown here an electric generator 36 coupled to the shaft of the compressor as typifying any suitable or feasible means for converting the excess energy.

A vital feature of the invention resides in the use of water to reduce the temperature of the hot gases coming from the combustion chamber to a safe temperature for impingement on the turbine blades, and employment of the expansive power of the steam developed in thus cooling the gases to drive the turbine. With the use of oil as fuel, the temperature of combustion is in the neighborhood of 3800° F. There are some variations of temperature as between different grades of oil and different fuels, but in any case the flames produced by combustion are intensely hot and far hotter than turbine blades are able to withstand. Recent developments in metallurgy have made it possible to produce turbine blades which will run for a satisfactory length of time under temperatures up to 1200° or 1500° F., but not at temperatures at all nearly approaching the temperature of combustion. I have provided in this invention means for supplying water in quantities sufficient to reduce the temperature of the gases to the neighborhood of 1000° F. and produce at the same time superheated steam at the same temperature.

The water supply system comprises, in addition to the nozzle or spray head 16 previously described, a pump 38 connected to take water from any suitable source of supply through a pipe 39 and deliver water through a pipe 40 to the nozzle 16. The pump is driven by means herein shown as an electric motor 41 and is associated with controls whereby it delivers water only when the temperature in the vaporizing chamber 15 is sufficiently high to convert it quickly into steam, and the water is delivered at a regulated pressure and a temperature sufficiently near the boiling point. The means for starting and stopping the pump in accordance with the gas temperature are typified herein by a thermostat 42 in the duct 17 and an electric switch 43 in the circuit of the motor 41 operated by the thermostat 42 with calibration such as to cause the pump to run as soon after starting of the system, and as long as, the temperature of the products of combustion is at a high enough degree to cause rapid vaporization of the spray of hot water. Between the outlet of the pump and the pipe 40, and in series connection therewith, is a chamber or pipe section 44 containing a shut-off valve 45 and a thermostat 46 coupled with the valve so as to close the valve when the temperature is below a prescribed critical degree and open it when the temperature rises above that degree. A heating coil or preheater 47 in the exhaust gas duct 18 of the turbine is coupled with the section 44, or other points in the pipe line, by means of by-pass connections 48 and 49, the former of which takes water from between the pump and valve 45 and the other delivers water at the other side of the valve in a region where its temperature directly affects the thermostat 46. With the valve 45 closed, all of the water flows through the heating coil and is heated by the exhaust gases and vapors; but if heated to a degree too near the boiling point, the thermostat is caused to open the valve 45 enough to admit water directly from the pump.

A by-pass 50 around the pump is connected in the pipe line. This by-pass includes a spring-loaded check valve 51, of known character, which normally closes the by-pass but opens to permit passage of water when the pressure in the line at the delivery side of the pump is above a predetermined degree. An adjuster 52 is provided to increase or diminish the resistance of the spring, and so regulate the pressure in the line. Such pressure is set at a value enough greater than that of the air pressure created by the compressor 12 to cause forcible emission of water from the nozzle 16 as a fine spray. A pressure differential in the order of 10 pounds per square inch is sufficient for this purpose. Thus, for instance, if the air pressure is 60 pounds per square inch, the water may be supplied at a pressure of 70 pounds. A manually controlled valve 53 is located in the pipe line for regulating the quantity of water delivered, or shutting it off, independently of the pump.

The fuel supplied to the burner 14 may be oil of any suitable quality and grade. It is conveyed by a pump 54 from any suitable source of supply, with which the intake pipe 55 to the pump is connected, through a pipe line 56 to the burner 14. A manual control valve 57, an automatic control valve 58 and a check valve 59 are connected in the pipe line 56. The automatic valve 58 is controlled so as to admit oil in proportion to the quantity of air delivered by the compressor 12. Various control means may be provided for this purpose. The one shown by way of example in Figure 1 comprises diaphragm chamber 60 containing a diaphragm 61 which is connected with a gate in valve 58 by a rod 62. In the air supply duct 27 leading to the compressor there is mounted a funnel 63 having an orifice of substantially smaller area than the area of the duct between its entrance and the funnel. A tube 64 connects the funnel orifice with the chamber 60 at one side of diaphragm 61 and a tube 65 connects the larger area of duct 27 between the intake thereof and the funnel with chamber 60 at the opposite side of the diaphragm. The pressure in the funnel orifice and pipe 64 is lower when the engine is running than that at the intake side of the funnel and in the pipe 65; and these pipes are so related to the diaphragm 61 that the higher pressure transmitted by pipe 65 tends to open the gate in valve 58. The diaphragm and valve gate are so loaded, by a weight or spring means or the tension of the diaphragm or otherwise, that when the pressures are equal, as is the case when the engine is at rest, the valve is closed; and when the pressures are unequal, the valve is opened in proportion to the pressure difference. The pressure differential is generally proportional to the speed of the compressor and the quality of air delivered thereby to the combustion chamber. Thus the fuel is supplied in a substantially uniform ratio to the quantity of air delivered to the combustion chamber. This ratio is preferably established at about 1 pound of oil to 200 cubic feet of air, or in that neighborhood; giving a slight excess of oxygen over the calculated amount needed to combine with the carbon and hydrogen of the fuel, in order to ensure complete combustion of the carbon.

A by-pass 67, substantially like the by-pass 56, is connected in the line around the fuel pump 54 to take care of the excess of oil delivered by the pump over that which can pass through the valves 57 and 58. The relief valve 68 in the by-pass is adjustably loaded to maintain a pressure of oil at the nozzle 14 sufficient to cause delivery of the oil in a fine spray or mist. This pressure is preferably 70 pounds or more per square inch when the air pressure is 60 pounds per square inch.

A valve 69 is mounted at the junction between the combustion chamber 13 and the duct 29 which leads thereto from the air compressor. As here shown the valve 69 is one of the butterfly type mounted by means of a pivot 70 or equivalent trunnions so that it may either extend across and close the passage into the combustion chamber, or occupy positions more or less nearly parallel to the stream flow through the passage. It is loaded by a weight 71, or equivalent means, arranged to exert a closing tendency and effective to close the valve when no force is acting to open it. The pivot axis of the valve moreover is located at one side of the median line of the surface area of the valve, whereby the areas at opposite sides of this axis are unequal and unbalanced pressures are exerted at opposite sides of the axis by air flowing from the compressor. An internal ledge 72 is formed in the interior of the duct above the margin of the larger area of the valve (i. e. between that margin and the outlet from the compressor) and a ledge 73 is located at the opposite side of the margin of the smaller area of the valve. By virtue of these characteristics, the pressure of air delivered from the compressor tends to open the valve and back pressure in the combustion chamber, in conjunction with the weight 71 tends to close it. This valve is employed to control the operation of the fuel pump 54 and the operation of a starting burner through agencies presently described. Air supplied at the prescribed working pressure opens the valve widely.

An auxiliary or starting burner 74 is provided to put the engine into motion from a condition of rest. This starting burner is preferably located to inject fuel and combustion air into the combustion chamber 13, although it may be located anywhere in advance of the vaporizing chamber and the water admission nozzle. For convenience of illustration it is shown in Figure 1 as located at the entrance to the vaporizing chamber. It is provided with an independent pressure blower or fan 75 receiving air from the atmosphere, with a spray nozzle 76 arranged to discharge oil in the air stream, and with a pump 76a connected to receive oil from the supply pipe 55 and convey it to the nozzle. A substantial pressure is developed thereby, which may be in the order of from five to ten pound, and is sufficient to overcome the inertia of the turbine and compressor. This burner is equipped with suitable igniting means, preferably electric, and with all necessary safeguards and controls. For this part of the apparatus I may use any of the known commercial types of domestic oil burner, of which there are many on the market, together with any or all of the regulators, controllers, and safety features which are commonly provided with such burners. As the invention involves nothing novel in the details of the auxiliary burner, the simplified showing of blower, nozzle and oil pump may be taken as typifying any known or other suitable burner, including all necessary or desirable adjuncts. A check valve 761 is connected in the oil line and a damper or check valve 762 in the air passage to prevent back flow when the engine is in normal operation.

It is necessary that, when the engine is at rest, the starting burner be in condition for operation and the main burner inoperative; and that after the turbine and main air compressor have attained speed enough to furnish an adequate supply of air, the starting burner be shut off and the main burner started. The invention includes means for meeting these requirements. Illustrative embodiments of such means are described as follows:

An electric motor 77 is coupled to drive the main fuel pump 54, and an electric motor 78 to drive the blower 75 and pump 76a of the starting burner. These motors are both connected in circuit with a source 79 of electric current. The circuit of the motor 77 includes a conductor 80 leading from the source 79 to a switch arm 81, which is normally closed with a contact 82, and a conductive segment 83 in connection with the contact 82. A second segment 84 of conductive material is connected with a conductor 85 which leads to one terminal of the motor 77; and a conductor 86 leads from the other terminal of the motor to the opposite side of the current source 79 from that to which the conductor 80 is connected. A conductor 87 connects segment 83 with one terminal of the starting burner motor 78. A stationary contact 88 beside the segment 84 is connected by a conductor 89 with one terminal of the current source 79; and the opposite terminal of the current source is connected by a conductor 90 with the opposite terminal of the motor 78 from that to which the conductor 87 is connected. An arm 91 is mechanically connected to the valve 69 so as to be moved thereby when the valve is shifted between its closed position and partly or wholly opened positions. It includes a conducting portion arranged to bridge across the space between the segment 83 and the arc on which the segment 84 and contact 88 are located. It is insulated from the valve pivot, and is so arranged that it remains in contact with segment 83 in all positions of the valve 69, closed or open. The segment 84 and contact 88 are arranged relatively to the bridge arm 91 so that, when valve 69 is fully closed, the arm engages contact 88 but is separated from segment 84; but when the valve is partly removed from closed position, and in all of its partly or wholly open positions, arm 91 is separated from contact 88 and in contact with segment 84. A push-button switch 92, or other equivalent circuit controller, is coupled in the circuit of motor 78. Thus, when the valve 69 is fully closed and control switch 92 is closed, the auxiliary burner is started. The circuit is then from the current source to the motor 78, thence through conductor 87 to segment 83, through bridge arm 91 to contact 88, and thence through the conductor 89 back to the source. But when the valve 69 is shifted to partly or wholly open position by flow of air, the circuit of motor 78 is opened and the circuit of motor 77 is closed through conductor 80, switch 81—82, segment 83, arm 91, segment 84, conductor 85, the windings of the motor, and conductor 86.

The switch arm 81 is coupled by means of a push rod with a piston 93 (or equivalent diaphragm) in a pressure chamber which is connected by a pipe 94 with the entrance end of the combustion chamber to receive pressure therefrom. These parts are so arranged that pressure in the combustion chamber sufficient to overcome the resistance of a spring 95, which acts on the piston in opposition to the fluid pressure, separates switch arm 81 from contact 82 and opens the circuit of motor 77.

The current for the motor 41 of the water pump is furnished from the same source 79, the opposite terminals of which are connected by conductors 96 and 97 with the motor 41 and switch 43 respectively. A conductor 98 completes the circuit between the motor and switch. A manual switch 99 may be coupled in any part of this circuit. Both manually operated switches 92 and 99 are preferably of a type which remains closed after having been placed in closed position. Either or both of them may be of a type which is automatically opened when the current flow is otherwise interrupted; and the switch 92 is preferably of that type.

The walls of the combustion chamber, and of adjacent parts of the gas conduits which are subjected to the most intense heat, are preferably lined with refractory material, such as fire-brick 100.

Where more or less sharp turns or elbows occur in the conduits through which gases flow to and from the turbine, guide vanes 101 are mounted. Such vanes have curved surfaces of similar curvature to the bends of the conduit walls and are arranged with their axes of curvature substantially parallel to those of the walls. They act to split the stream of gases into fractions and change the direction of flow of each fraction separately, avoiding turbulence and eddies at the bends. The vanes are further designed so that the sum of the widths of the channels between them is equal to the total width of the conduit at either side of the bend, thereby preventing the gas from slowing down, due to larger cross-sectional area at the bend, with consequent loss of energy.

A condenser 102 is located in the exhaust duct 18, consisting of tubes mounted at their ends in tube sheets 103 and 104 which cross the duct; and the conduit 29 leading from the compressor 12 to the combustion chamber 13 is connected to that part of the exhaust duct which is bounded by the tube sheets so that the air passing to the combustion chamber flows across the condenser tubes and absorbs heat therefrom. Preferably the tubes are provided with external fins to increase the rapidity and efficiency of heat conduction. Thereby more or less of the exhaust steam from the turbine is condensed and the latent heat of the steam is usefully applied in raising the temperature of the air. For condensing such steam as passes through the condenser 102, a further condenser 105 is provided, consisting of tubes crossing the exhaust duct through which water is caused to flow by supply and return pipes 106, 107. The water of condensation collects in a sump 108 from which it is transferred, by means later described to a collection tank 111. The water of condensation may be used again, and for that purpose a pipe 112 is connected with the tank 111 and with the pipe 39 leading to the water pump 38. Valves 113 and 114 are preferably located in the pipe lines at suitable points such that the water for vaporization may be taken wholly from either the tank 111 or another source, or partly from both. An overflow 115 connected with the tank 111 permits disposal of any excess of water of condensation resulting from combustion of the fuel over losses of steam in the apparatus.

A pressure gage 116 and thermometer 117 are connected with conduit 17 to show the pressure and temperature of the gases and vapors entering the turbine. Such instruments may be located at other points in the conduits as desired.

A throttle valve 118 is located in the duct 17 near the intake of the turbine for regulating the speed of the latter or shutting it down. The valve shown in Figure 1 is of the well known balanced type having an external stem 119 and spring 120 arranged to apply force tending to close the valve, and with which there is associated an operating lever 121 and link 122 for opening the valve.

A hot plate 123' is preferably mounted in the duct or vaporizing chamber 15 beneath the spray head 16. It is located to catch globules and drops falling from the spray head and is located above the bottom of the wall of the duct, whereby it is highly heated by the gases flowing under it, and is enabled to vaporize instantly any water which falls upon it.

In operation, the engine is started from rest by starting the auxiliary burner 74. The pressure imposed on the air introduced by the blower 75, and resulting from the combustion of fuel, is confined by entrance valve 69, which is then closed. The hot gases from the auxiliary burner pass to the turbine, the throttle valve 118 being then open, affecting the thermostat 42 on the way. When the temperature of the gases at the thermostat attains the predetermined degree, the water pump 38 is started and water is sprayed into the hot gas and instantly converted into steam. The turbine 11, and with it the axial compressor 12, is started and air is delivered from the compressor at a pressure which increases as the speed of the turbine increases. When this pressure exceeds the back pressure in the combustion chamber due to the auxiliary burner, air from the compressor enters the combustion chamber, displacing the entrance valve 69 and shifting the switch arm 91 so as to start the main fuel pump, ignite the oil then issuing from the main burner 14, and put the auxiliary burner out of operation. It may be noted at this point that the main burner, like the auxiliary burner, is provided with suitable means, which may be of any known character and activated by any suitable means when the valve 69 opens, to ignite the fuel at the main burner. As previously explained in connection with the auxiliary burner, means suitable for this purpose are well known in the art and require no description or illustration herein. Thereafter the turbine continues to run as long as the throttle valve is open.

If desired, the contacts 88 and 84 may be arranged to overlap, while being insulated from each other, or otherwise suitably disposed with respect to the bridging conductor 91, so as to delay shutting off of the auxiliary burner until after the main burner has been started, and the turbine has run long enough to develop a sufficient air pressure by means of the compressor 12 to ensure continued running.

The speed of the engine may be controlled and regulated by opening the throttle valve 118 more or less widely; and the engine may be stopped by closing that valve. In reducing or accelerating the speed of the turbine by means of the throttle, the supply of air furnished by the compressor is correspondingly reduced or increased and the fuel supply to the burner 14 is reduced or increased in proportion. When the turbine is stopped by closing the throttle valve, the gas pressure confined in the ducts and combustion chamber causes the valve 69 to be closed and the oil pump 34 to be stopped. Although the arm 91 and contact 88 are then in circuit-closing connection, the auxiliary burner is not started because the starting switch 92 thereof is open.

In one of the preferred embodiments of the invention, the compressor is designed to develop an air pressure of approximately 60 pounds per square inch; the main oil pump is adjusted and regulated to deliver oil at a pressure of about 70 pounds per square inch and to deliver oil at the rate of approximately or substantially one pound for each 200 cubic feet of air at atmospheric pressure admitted to the compressor; and the water supply system is set and operated to deliver water at a pressure in the neighborhood of 70 pounds per square inch and at a rate of 10 or 11 pounds per pound of oil consumed. These relative quantities of air, oil and water cause practically complete combustion of the oil, generation of temperatures in the order of 3800° F., more or less, depending on the grade of oil, reduce the temperature of the gases at the vaporizing chamber to a temperature in the order of 1000° F., and convert all of the admitted water into steam with from two hundred to three hundred degrees of super-heat. A considerable variation in the temperature of the steam and gases leaving the vaporizing chamber may be obtained by admitting water at a greater or less rate.

In passing through the turbine, the expansive force of the steam produces a large increase of velocity and force over that due to the hot gases, causing the turbine to develop more power than is possible by means of a comparable turbine driven by hot products of combustion alone. By this means a considerable increase of efficiency over the gas turbine is obtained. Condensation of the steam, effected by the condensers 102 and 105, substantially reduces the volume and back pressure of the exhaust vapors. Much of the latent heat of the steam is recovered by conduction into the air flowing to the combustion chamber.

Another and very large increase of efficiency results from the reduction of power needed to drive the air compressor. Inasmuch as only enough air need be provided to effect substantially complete combustion of the fuel, instead of a ten to twelve fold excess for cooling the products of combustion, the compressor need be only about one-tenth as large and require about one-tenth as much energy for its operation as required for the compressor of a turbine driven by gas alone.

The exhauster, mentioned in the introductory part of this specification, is combined with other parts of the apparatus for obtaining increased economy and efficiency by developing a vacuum in the exhaust conduit from the turbine. The one here shown is a machine of turbine character essentially like the axial compressor 12, except that it is of larger diameter sufficient to take attenuated gases and compress them to atmospheric pressure. As shown in this illustration, the exhauster comprises a rotor 123 having blades 124 rotating in a housing 125 between sets of fixed blades 126 secured to the housing. The shaft of the rotor is coupled to the shaft of the air compressor 12 and to the electric generator or the like 36 to be driven by the turbine and drive the generator. The exhaust duct 18 from the turbine opens into the intake chamber 127 of the exhauster, and the delivery from the latter passes to the atmosphere through a duct 128.

With this combination a sub-atmospheric pressure exists in the sump 108 which receives water condensed from the turbine exhaust. The collected water is taken by a pump 131 and delivered to tank 111 through a pipe 109 and a filter 110. Control means are provided to ensure maintenance of a body of water over the intake pipe 132 to the pump. Such means comprise, in this illustration, an electric motor 133 coupled to drive the pump, deriving current from the source 79, or any other suitable source. In the circuit of the motor are separated contacts 134 and 135; and a switch member 136 is adapted to bridge across the gap between said contacts, or to be separated therefrom by a float 137 contained in the sump 108 and supported by the water therein. The float is connected to an arm pivoted to the sump wall and to which is connected an arm 138 arranged to have a lost motion connection with the switch bridge 136 so as to open the switch when the water level falls to a prescribed minimum point, and to close it when the water rises.

The exhauster here shown is capable of pulling a vacuum of more than fifteen inches of mercury and thereby largely augmenting power developed at the turbine by the steam-gas mixture. A check valve 132a between the hot well and pump is arranged to prevent inflow of air through the pump to the exhaust channels.

In combinations like that described, except in having no exhauster, there may be a simple gravity drainage connection from the sump 108 to the tank 111.

Instead of having the exhauster in tandem with the turbine, compressor, and power converter, it may be mounted at one side thereof and driven by other means than a direct coupling.

Many modifications and variations may be made from the design shown in the preceding figures, some of which are shown in Figures 2 to 9 inclusive.

The variation shown in Figure 2 consists in means for regulating the delivery of water from the water supply pump 38 in accordance with the temperature of the fluids passing to the turbine. A gate valve 38a is connected in the pipe line leading away from the pump 38, at a location between the by-pass 50 and the point at which the connection to the heating coil 47 joins the pipe line. This valve is connected with a thermostat 42a in the duct 17 by a linkage shown diagrammatically and designated as a whole by the reference character 381. The thermostat and linkage are organized to close the valve when the temperature in duct 17 is below that prescribed for the working fluid, and to open the valve when the temperature rises. The pump is caused to run constantly, and may be started by closing a switch in the circuit of its driving motor, or otherwise, at any time before excessively hot products of combustion have reached the turbine. All of the water unable to pass through valve 38a then flows through the by-pass 50. As the temperature of the gases increases, valve 38a is progressively opened until it allows enough water to pass to hold the working fluid to the prescribed operating temperature.

Figure 3 shows an alternative arrangement according to which the delivery from the fuel pump 54 to the nozzle or burner 14 is controlled by the butterfly valve 69 at the entrance to the combustion chamber through direct actuation of a valve 139 in the delivery pipe from the pump, such valve having an operating arm which is connected by a link 140 with an arm 141 rigidly connected with the butterfly valve. A check valve, manual control valve, and by-pass, like those shown at 59, 57 and 67 respectively in Figure 1, are preferably combined also in this modification.

Figure 4 shows an alternative form of burner 155 adapted to be used in place of the oil nozzle or spray head 14 for the combustion of gas or pulverized solid fuel. Burner 155 comprises a tube passing through one wall of an elbow or offset in the duct which delivers air from the compressor to the combustion chamber, having apertures 156 in its end through which gas or powdered coal may be emitted. An igniter 157 is provided to establish a high-temperature zone beyond the burner 155 for igniting powdered coal when that type of fuel is used. Such igniter is here presented as a pilot burner adapted to be supplied with combustible gas and to maintain a flame at a suitable distance from the outlet of burner 155.

Figure 5 shows a variation in means for starting the turbine. Here the main burner is used for that purpose, being then supplied with oil by a pump 142. The air for starting purposes is furnished by a blower 143 delivering to the combustion chamber past an automatic butterfly valve 144 which is substantially like valve 69 in that it is designed to open when air flows from the blower and to close when the back pressure in the combustion chamber is equal to or greater than that applied by the blower. The motive means for the main fuel pump 54 and for the auxiliary fuel pump 142 and blower 143 may be controlled by like means to those described for control of the auxiliary burner and main fuel pump in Figure 1. Also shown in Figure 5 is a compression chamber 145 connected with the delivery line from the main fuel pump and in the upper part of which air is confined. Fuel oil enters this chamber, compressing the air therein when the oil delivery is reduced either by the manual control valve 57 or by an automatic valve such as that shown at 58 in Figure 1; and is prevented by a check valve 146 from flowing back to the pump.

Figure 6 shows a governor of the centrifugal type to regulate the oil delivery to the main burner, which may be used in substitution for, or combination with, the pressure governor shown in Figure 1. A shaft 147 carrying a pair of weighted arms 148 is driven from the air compressor shaft by gearing 149, 150, 151, 152. The weighted arms are connected to an endwise movable rod passing through shaft 147 to close more or less a valve 153 in the oil supply line when the speed of the motor exceeds a prescribed rate. Other known forms of centrifugal governor than this one may be used equally well.

In Figure 7 a variation is shown where the air condenser 102 is located in the intake to the air compressor instead of in the delivery passage from the compressor, the exhaust duct from the turbine being suitably disposed to accommodate this different location. Both arrangements are within the scope of the protection which I claim, and each has some advantage over the other for certain purposes. The arrangement in the intake has the merit that air at lower temperature, that is without the heat of compression developed in the compressed air, is brought into thermal contact with the exhaust steam, while the arrangement with the condenser in the outlet passage has the advantage of better heat conductivity due to greater density of the air and it does not rarefy the air prior to compression. A water condenser 105 is here shown in tandem arrangement with the air condenser. This same relative location of air condenser and water condenser may be used in conjunction with the combination employing an exhauster as shown in Figure 2, the duct beyond the water condenser being connected to the intake of the exhauster.

Figure 8 shows a throttle in the form of a butterfly valve 154 which may be substituted for the balanced poppet type throttle valve 118 shown in Figure 1. The engine can, however, be employed without any throttle valve for purposes which do not require rapid and considerable changes of speed and power output.

A means alternative to those shown in Figures 1 and 5 for controlling the auxiliary or starting burner and the main burner is shown in Figure 9. Here the shifting over from one to the other is governed by the temperature of the exhaust fluid from the turbine. A thermostat 159 is coupled with a switch 160 which is adapted to close the circuit of the driving motor 78 for the auxiliary burner when the temperature of the exhaust gases is low, and to break that circuit and close the circuit of the motor 77 which drives the supply pump for the main burner, when the temperature of the exhaust rises to a prescribed degree. These motors and the source of current are shown diagrammatically in Figure 9, and it is to be understood that they may be coupled to pumps and a blower in the manner shown in Figure 1, or in any other satisfactory way.

The foregoing do not show all of the variations permissible within the scope of the invention, but they are sufficient to indicate something of the character and range of permissible variations.

A starter which may be alternative to the starting means previously described, or used in conjunction therewith, is shown at 161 in Figures 1 and 8 and may be an electric motor coupled to the shaft of the turbine in any manner effective and suitable for applying torque thereto.

The pumps 38, 54 and 142 shown herein are represented as gear pumps. That type of pump is preferred, but not obligatory, as pumps of other characters may be employed for the same purposes.

What I claim and desire to secure by Letters Patent is:

1. A power generating apparatus, comprising a turbine, an air compressor coupled with the turbine to be driven thereby, a combustion chamber in connection with the compressor to receive air therefrom, a conduit leading from the combustion chamber to the intake of the turbine and including a portion constituting a vaporizing chamber, a fuel burner in the combustion chamber, an automatic regulator for governing the fuel supply to said burner in a prescribed ratio to the quantity of air passing through the compressor, means for injecting water into the stream of gases flowing from the combustion chamber to the turbine, and regulating means for controlling the amount of water passing to said injection means, including a thermostat in said duct near the turbine, and means for heating the water by exhaust gas from the turbine.

2. A power generating apparatus comprising a turbine, a turbine type air compressor, a turbine type exhauster, said compressor and exhauster being coupled with the turbine to be driven thereby, a series of conduits leading from the outlet of the compressor to the intake of the turbine including a combustion chamber, an exhaust duct leading from the outlet of the turbine to the intake of the exhauster, means entering the conduit at a point between the combustion chamber and the turbine intake for injecting water thereinto, a condenser in the exhaust duct between the outlet from the turbine and the intake to the exhauster for condensing water vapor in the fluids exhausted from the turbine, a sump between the condenser and exhauster arranged to receive water of condensation, a pump connected to take water from said sump, and means controlled by the level of water in the sump to stop the pump from operating when said water level is lowered to a prescribed extent.

3. A power generating apparatus comprising a turbine, an air compressor driven by the turbine, conduits leading in series from the outlet of said compressor to the intake of the turbine and including a portion wherein fuel is burned, an automatic valve at the entrance to said portion constructed to be opened by air flowing into said portion from the compressor and to be closed by excess back pressure in said portion, a main fuel supply means leading to said portion, an auxiliary means for supplying fuel and air to said portion for starting the turbine, a spray nozzle opening into the conduits at a location between said fuel supply means and the turbine intake, a controller operated by said valve for shutting down the auxiliary supply means and putting the main supply means in operation when the valve is open and for shutting down the main supply means when the valve is closed, and thermostatically controlled water conducting means leading to the spray nozzle for causing emission of water from the nozzle when the gases in the conduit have a predetermined temperature.

EDWIN T. WYMAN.

REFERENCES CITED

The following references are of record in the file of this patent:

UNITED STATES PATENTS

| Number | Name | Date |
|---|---|---|
| 864,821 | Zoelly | Sept. 3, 1907 |
| 986,308 | Ostergren | Mar. 7, 1911 |
| 991,179 | Stodola | May 2, 1911 |
| 1,087,451 | Kraus | Feb. 17, 1914 |
| 1,462,470 | Adamson | July 24, 1923 |
| 1,738,507 | Weir | Dec. 3, 1929 |
| 1,854,615 | Lasley | Apr. 19, 1932 |
| 1,874,314 | Lasley | Aug. 30, 1932 |
| 1,988,456 | Lysholm | Jan. 22, 1935 |
| 1,988,458 | Lysholm | Jan. 22, 1935 |
| 2,056,198 | Lasley | Oct. 6, 1936 |
| 2,078,958 | Lysholm | May 4, 1937 |
| 2,095,991 | Lysholm | Oct. 19, 1937 |
| 2,115,338 | Lysholm | Apr. 26, 1938 |
| 2,219,994 | Jung | Oct. 29, 1940 |
| 2,221,185 | Farlow | Nov. 12, 1940 |
| 2,225,310 | Lindhagen | Dec. 17, 1940 |
| 2,297,979 | Peck | Oct. 6, 1942 |
| 2,322,717 | Nettel | June 22, 1943 |
| 2,325,619 | Lysholm | Aug. 3, 1943 |
| 2,349,600 | Adams | May 23, 1944 |
| 2,365,551 | Hermitte | Dec. 19, 1944 |
| 2,365,616 | Zweifel | Dec. 19, 1944 |
| 2,382,707 | Gosslau et al. | Aug. 14, 1945 |
| 2,384,282 | Chandler | Sept. 4, 1945 |

FOREIGN PATENTS

| Number | Country | Date |
|---|---|---|
| 490,978 | Great Britain | Aug. 24, 1938 |